D. H. Dickey,
Tooth Extractor.
Nº 902.    Patented Aug. 30, 1838.
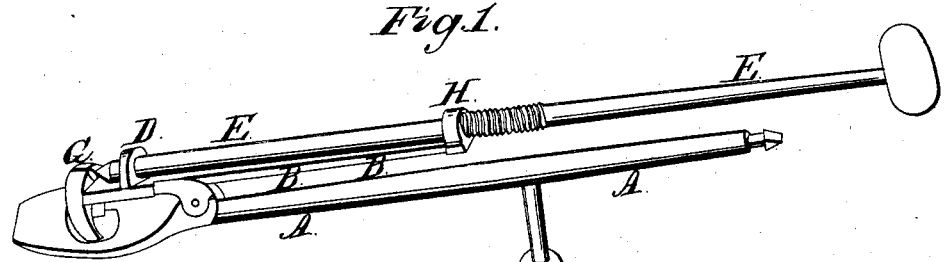
Fig. 1.
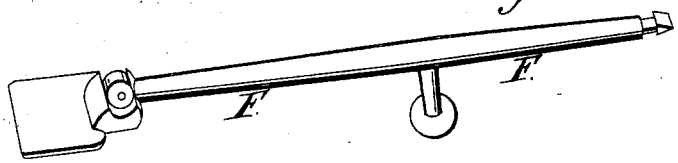
Fig. 2.
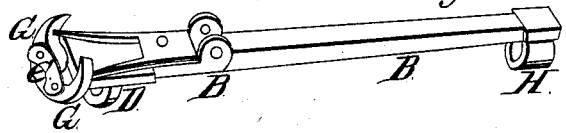
Fig. 3.
Fig. 4.

UNITED STATES PATENT OFFICE.

DAVID H. DICKEY, OF BOSTON, MASSACHUSETTS.

VERTICAL TOOTH-EXTRACTOR.

Specification of Letters Patent No. 902, dated August 30, 1838.

*To all whom it may concern:*

Be it known that I, DAVID H. DICKEY, of Boston, in the county of Suffolk and State of Massachusetts, have invented a new and useful Improvement in Instruments for Extracting Teeth, which I denominate "Dickey's Vertical Tooth-Extractor"; and I do hereby declare that the following is a full and exact description thereof, reference being had to drawings accompanying and making part of this specification.

In the accompanying drawings Figure 1 represents a perspective view of the instruments entire. Fig. 2, the short plate. Fig. 3, the claws and supporting plate. Fig. 4, the short lever reversed exhibiting the springs.

I construct my "vertical tooth extractors" from steel or any other suitable metal, and that part called the tooth-plate is made from a rod of any suitable length and flattened at that end which rests upon the teeth adjoining the one to be extracted, through which flattened part or end an aperture is made sufficiently large to admit of the action of the claws on the tooth. On the upper side and near this aperture, connected by a suitable joint is a short lever B, from that end of which directly over the aperture projects two pivots which pass through the claws, and a supporting plate C, on which pivots the claws turn, and are secured by a screw or in any other convenient way. The claws thus situated are made in a circular form, and turn on the above mentioned pivots near their centers on the under side of this lever, near the outer end I attach two springs which extend beyond the outer end, running parallel with the lever, and act upon the inside of the lower extremities of the claws, for opening them when the pointed lever is withdrawn. Directly back of the claws and on the upper side of this lever is a projection D through which is an aperture, and on the outer end is a similar projection H, in which is formed a female screw, Through these two projections passes another lever E extending from the outer end of the instrument to the claws, that end of which nearest the claws is made pointed and forms a revolving wedge, which point or revolving wedge works into a semicircular groove on the inside of the top of the claws, while the other is terminated with a thumbpiece, by which the lever is turned, and made to operate by means of a male screw in the center of the lever working into the female screw in the projection on the end of lever B, so that the pointed end works into the semicircular groove, and causes a contraction of the lower extremities of the claws for the purpose of confining them to the tooth. The object of the beforementioned supporting plate is to prevent the expansion of the claws during the operation.

*Modus Operandi.*—The tooth plate A is placed upon the teeth adjoining the one to be extracted, with the aperture directly over it, the claws being placed on each side are made to adhere by means of the lever E working into the upper ends when the tooth is immediately withdrawn, by contracting the outer extremities of the tooth plate and lever. When necessary to extract the tooth farthest back in the jaw the plate A is removed and another F, is placed in its stead the flattened end of which extends only to the claws and thus permits of their action on such a tooth whereas the other would not.

What I claim as my invention and desire to secure by Letters Patent in the above described "vertical tooth extractor" is—

1. The lever C working in the female screw, with one end pointed, and forming a revolving wedge, for opening the upper parts of the forceps thereby contracting the lower or that part which is made to adhere to the tooth in combination with other parts of the instrument as before described.

2. The springs which act on the inside of the forceps for opening the lower part, when the revolving wedge is removed in combination with the lever B as herein set forth and described.

3. The peculiar arrangement of the different parts of the instrument substantially as herein described and set forth.

DAVID H. DICKEY.

Witnesses:
JOHN W. HUBBARD,
ABEL GAY.